(12) United States Patent
Weber

(10) Patent No.: US 8,932,507 B2
(45) Date of Patent: Jan. 13, 2015

(54) MOLDING SYSTEM INCLUDING SHOOTING-POT ASSEMBLY AND VALVE ASSEMBLY IN WHICH HOLD PRESSURE NOT PROVIDED BY SHOOTING POT ASSEMBLY

(75) Inventor: Robert Bruce Weber, Brampton (CA)

(73) Assignee: Husky Injection Molding Systems, Bolton, Ontario (CA)

( * ) Notice: Subject to any disclaimer, the term of this patent is extended or adjusted under 35 U.S.C. 154(b) by 38 days.

(21) Appl. No.: 13/988,552

(22) PCT Filed: Oct. 5, 2011

(86) PCT No.: PCT/CA2011/050627
§ 371 (c)(1),
(2), (4) Date: May 21, 2013

(87) PCT Pub. No.: WO2012/068681
PCT Pub. Date: May 31, 2012

(65) Prior Publication Data
US 2013/0236584 A1 Sep. 12, 2013

Related U.S. Application Data

(60) Provisional application No. 61/416,786, filed on Nov. 24, 2010.

(51) Int. Cl.
*B29C 31/02* (2006.01)
*B29C 45/02* (2006.01)
*B29C 45/27* (2006.01)
*B29C 45/54* (2006.01)
*B29C 45/57* (2006.01)

(52) U.S. Cl.
CPC ............ *B29C 31/02* (2013.01); *B29C 45/02* (2013.01); *B29C 45/2703* (2013.01); *B29C 45/54* (2013.01); *B29C 45/57* (2013.01)
USPC ......................................... 264/328.8; 425/561

(58) Field of Classification Search
CPC ........ B29C 31/02; B29C 45/54; B29C 45/57; B29C 45/2703; B29C 45/02
USPC ......... 425/560, 561, 568, 585, 562, 564, 566; 264/328.8, 328.13
See application file for complete search history.

(56) References Cited

U.S. PATENT DOCUMENTS 3,709,644 A * 1/1973 Farrell ........................ 425/160
4,722,679 A * 2/1988 Farrell ........................ 425/146

(Continued)

FOREIGN PATENT DOCUMENTS

| CA | 2450923 A1 | 4/1999 |
| EP | 0943412 A2 | 11/1999 |

OTHER PUBLICATIONS

International Search Report, 3 pages.

(Continued)

*Primary Examiner* — Yogendra Gupta
*Assistant Examiner* — Emmanuel S Luk

(57) ABSTRACT

A molding system (100), comprising: a shooting-pot assembly (102; 202A; 202B); and a valve assembly (104; 204A; 204B) having an input port (106; 206A; 206B) being configured to input a melt, an output port (108; 208A; 208B) being configured to output the melt, and a transfer port (110; 210A; 210B) connected to the shooting-pot assembly (102; 202A; 202B).

15 Claims, 3 Drawing Sheets

(56) References Cited

U.S. PATENT DOCUMENTS

Figure 1:
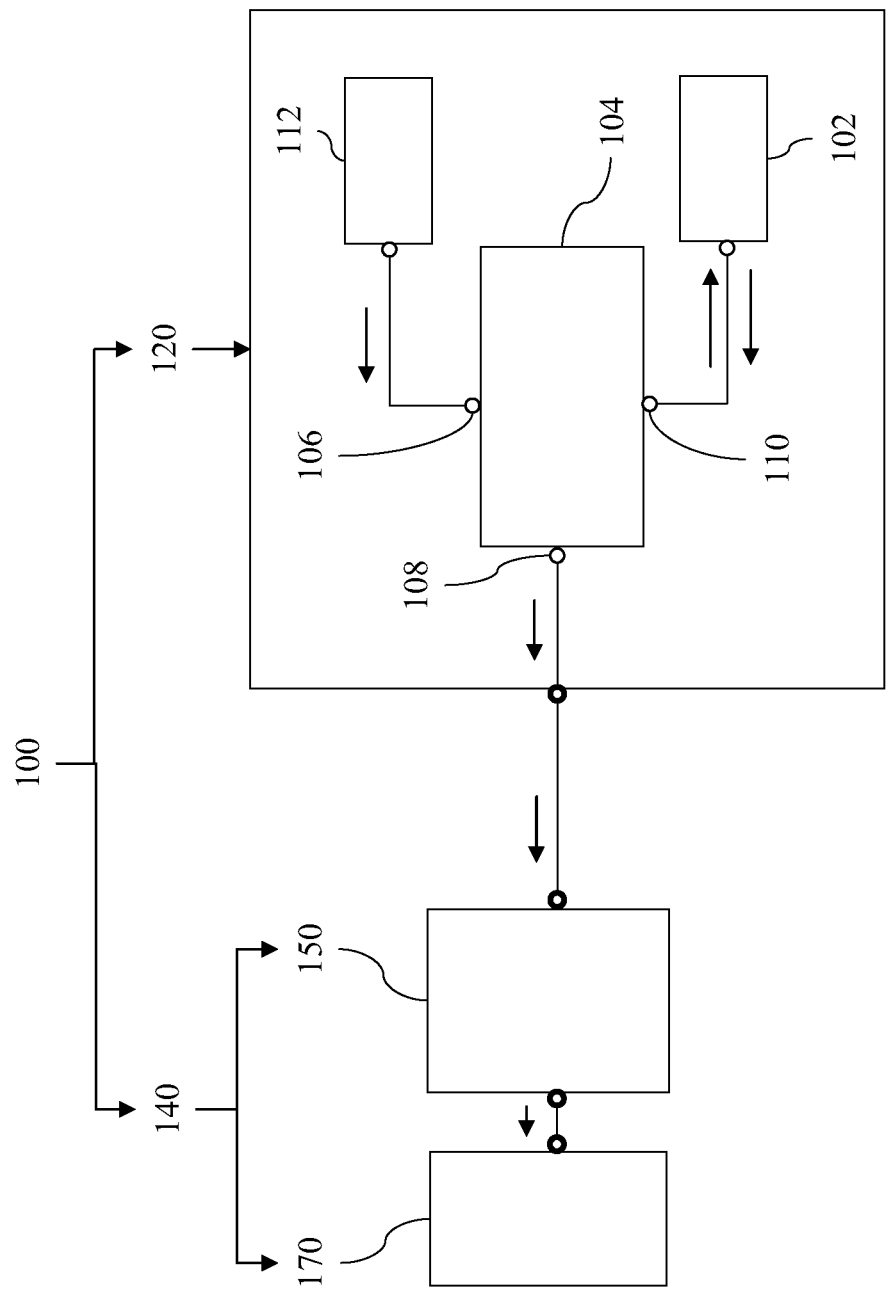

| | | | |
|---|---|---|---|
| 4,966,545 A | 10/1990 | Brown et al. | |
| 5,135,701 A * | 8/1992 | Farrell | 264/328.1 |
| 5,605,707 A * | 2/1997 | Ibar | 425/144 |
| 6,241,932 B1 * | 6/2001 | Choi et al. | 264/328.8 |
| 6,254,813 B1 * | 7/2001 | Eckardt et al. | 264/39 |
| 6,641,387 B1 * | 11/2003 | Letroublon et al. | 425/560 |
| 6,824,374 B1 * | 11/2004 | Seta et al. | 425/145 |
| 7,291,298 B2 * | 11/2007 | Serniuck et al. | 264/40.1 |
| 2005/0019441 A1 * | 1/2005 | Seta et al. | 425/145 |
| 2006/0003038 A1 | 1/2006 | Serniuck | |
| 2006/0006563 A1 | 1/2006 | Serniuck et al. | |

OTHER PUBLICATIONS

European Search Report, Gerald Gemeinböck, Aug. 29, 2014.

* cited by examiner

MOLDING SYSTEM INCLUDING SHOOTING-POT ASSEMBLY AND VALVE ASSEMBLY IN WHICH HOLD PRESSURE NOT PROVIDED BY SHOOTING POT ASSEMBLY

TECHNICAL FIELD

An aspect of the present invention generally relates to (but is not limited to) a molding system including (but not limited to) a shooting-pot assembly and a valve assembly.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley HYATT developed a plastic material he named Celluloid, improving on PARKES' invention so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process.

Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The total clamp force needed is determined by the projected area of the part being molded. This projected area is multiplied by a clamp force of from two to eight tons for each square inch of the projected areas. As a rule of thumb, four or five tons per square inch can be used for most products. If the plastic material is very stiff, it will require more injection pressure to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled. Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

Use of shooting pots in the hot runner, such that there is one to few cavities fed by each shooting pot, allows superior control of the fill rate balance but the pressure evenness during hold suffers. Due to the variety of losses in the shooting pots it is known that each one of the several, or many, in a given hot runner would each have different losses. The difference in these losses would be larger than a reasonable tolerance on the hold pressure such that even application of actuation force would not result in an even application of melt pressure. In order to set a hold pressure evenly across the mold cavities either expensive melt pressure transducers with feedback or a pre-measurement of each shooting pot loss, and subsequent compensation, would have to be employed. Neither solution is ideal due both to cost and repeatability in terms of sensor readings and the effect of changing process conditions on losses.

According to one aspect, there is provided a molding system (100), comprising: a shooting-pot assembly (102; 202A; 202B); and a valve assembly (104; 204A; 204B) having an input port (106; 206A; 206B) configured to input a melt, an output port (108; 208A; 208B) configured to output the melt, and a transfer port (110; 210A; 210B) connected to the shooting-pot assembly (102; 202A; 202B).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

Figure 2:
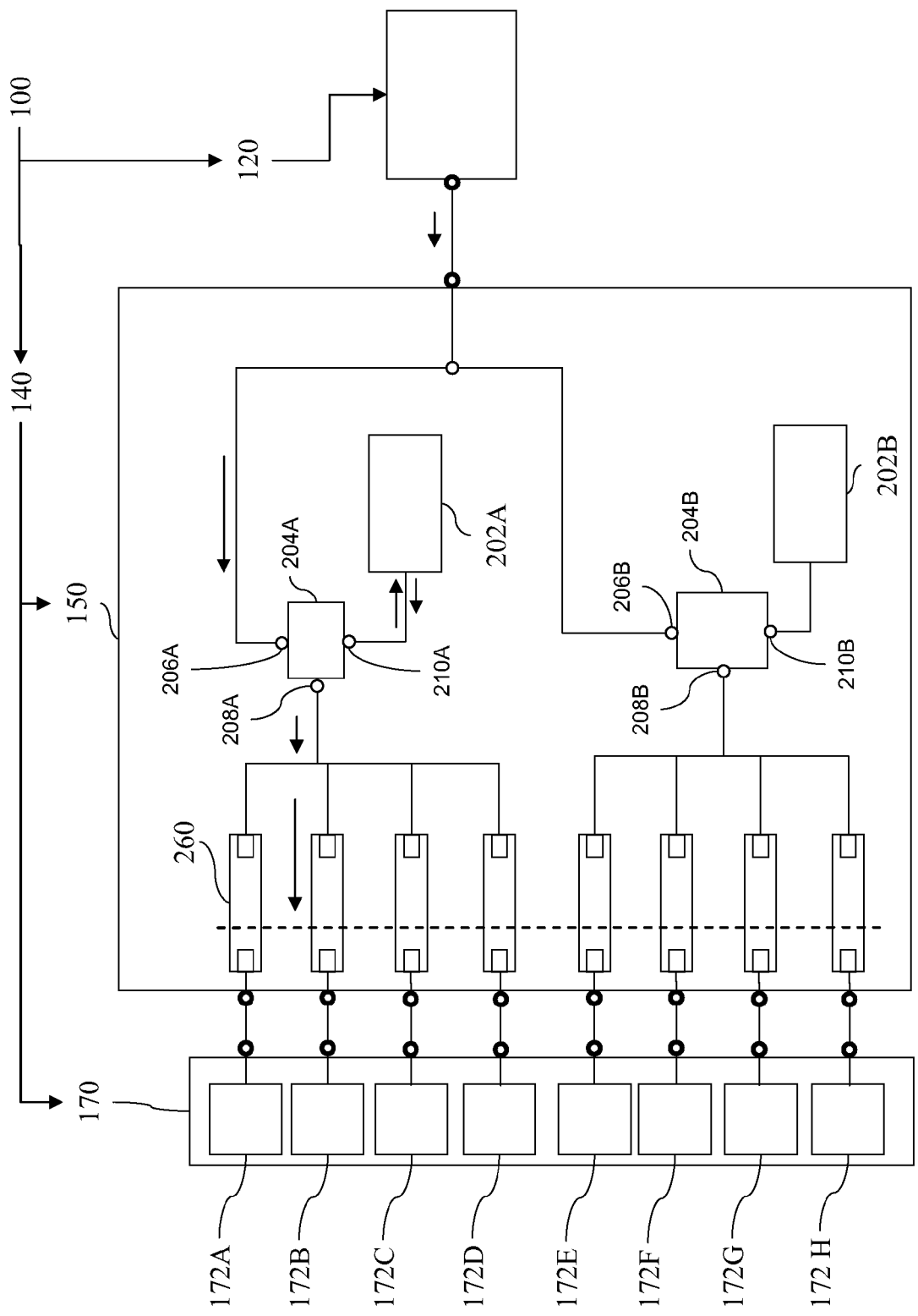
Figure 3:
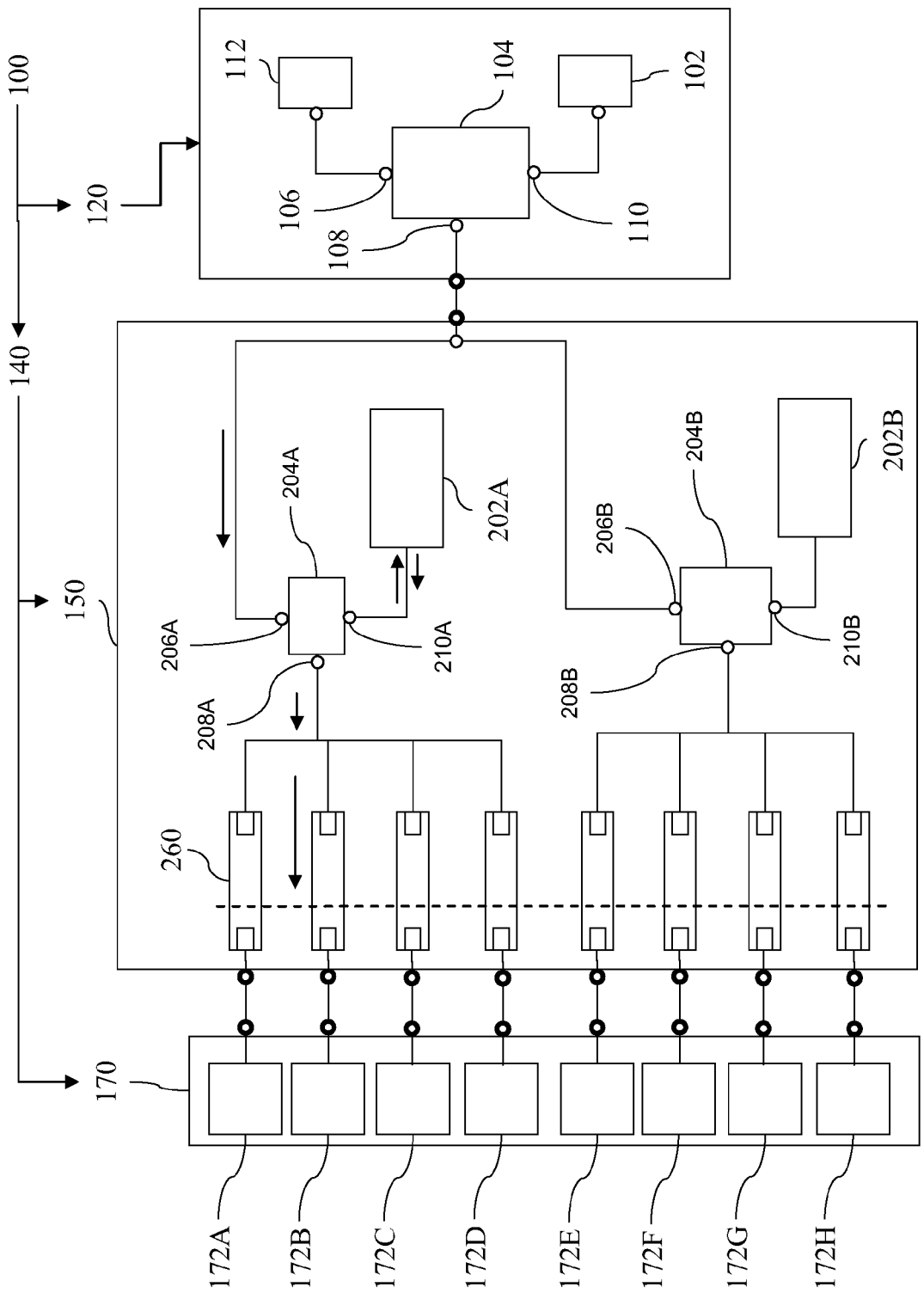

The non-limiting embodiments will be more fully appreciated by reference to the following detailed description of the non-limiting embodiments when taken in conjunction with the accompanying drawings, in which:

FIGS. 1, 2, 3 depict schematic representations of a molding system (100).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIG. 1 depicts the schematic representation of the molding system (100). The molding system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-

3), (iii) "*Injection Molding Systems*" 3rd Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

Generally, the molding system (100) may include (but is not limited to): (i) a machine melt-feeder assembly (120), (ii) a runner and feeder assembly (150), and (ii) a mold assembly (170). It will be appreciated that the runner and feeder assembly (150) and the mold assembly (170) are to be supported by a platen structure (known but not depicted) of the molding system (100). The machine melt-feeder assembly (120) prepares a melt that may be then conveyed to the runner and feeder assembly (150), and then the melt is distributed to the mold assembly (170) via the runner and feeder assembly (150).

More specifically, the molding system (100) includes (but is not limited to): (i) a shooting-pot assembly (102), and (ii) a valve assembly (104). The valve assembly (104) has (but is not limited to): (i) an input port (106), (ii) an output port (108), and (iii) a transfer port (110). The input port (106) is configured to input a melt, such as the melt from a melt source (112), which may be called an extruder, etc. The output port (108) is configured to output the melt. The transfer port (110) is connected to the shooting-pot assembly (102). The valve assembly (104) is configured to operate in (but is not limited to): (i) a first operation mode, (ii) a second operation mode, and (iii) a third operation mode. During the first operation mode, the output port (108) is shut off while permitting transfer of the melt from the input port (106) to the shooting-pot assembly (102). During the second operation mode, the input port (106) is shut off while permitting the shooting-pot assembly (102) to push the melt from the transfer port (110) to the output port (108). During the third operation mode, a hold pressure is permitted to be applied from the input port (106) to the output port (108), and the hold pressure not provided by the shooting-pot assembly (102).

More specifically, the molding system (100) may further include (but is not limited to): a machine melt-feeder assembly (120) having the valve assembly (104) and the shooting-pot assembly (102). There are two variations contemplated for the above arrangement. According to a first variation, the third operation mode of the valve assembly (104) is adapted so that the hold pressure is applied from the input port (106) to the output port (108) while the transfer port (110) is shut off, and as a result the shooting-pot assembly (102) does not become filled during the third operation mode. According to a second variation, the third operation mode of the valve assembly (104) is adapted so that the hold pressure is applied from the input port (106) to the output port (108) while the transfer port (110) is open so as to permit the melt to fill the shooting-pot assembly (102) during the third operation mode.

FIG. 2 depicts another schematic representation of the molding system (100) of FIG. 1. Generally, the mold assembly (170) may include (but is not limited to): a plurality of mold cavities (172A; 172B; 172C; 172D; 172E; 172F; 172G; 172H). A plurality of valve gates (260) are used to feed melt into respective mold cavities (172A; 172B; 172C; 172D; 172E; 172F; 172G; 172H). Placed between the valve gates (260) and the mold cavities (172A; 172B; 172C; 172D; 172E; 172F; 172G; 172H) is a melt distribution circuit that has an arrangement of shooting-pot assemblies (202A; 202B) and valve assemblies (204A; 204B). A combination of the shooting-pot assembly (202A) and the valve assembly (204A) is configured to distribute, in use, the melt to a collection of valve gates (260) and a collection of mold cavities (172A; 172B; 172C; 172D). A combination of the shooting-pot assembly (202B) and the valve assembly (204B) is configured to distribute, in use, the melt to another collection of valve gates (260) and another collection of mold assemblies (172E; 172F; 172G; 172H).

Specifically, the molding system (100) includes (but is not limited to): (i) a shooting-pot assembly (202), and (ii) a valve assembly (204A; 204B). The valve assembly (204A; 204B) has (but is not limited to): (i) an input port (206A; 206B), (ii) an output port (208A; 208B), and (iii) a transfer port (210A; 210B). The input port (206A; 206B) is configured to input a melt, such as from the output of the machine melt-feeder assembly (120). The output port (208A; 208B) is configured to output the melt. The transfer port (210A; 210B) is connected to the shooting-pot assembly (202A; 202B). The valve assembly (204A; 204B) is configured to operate in (but is not limited to): (i) a first operation mode, (ii) a second operation mode, and (iii) a third operation mode. During the first operation mode, the output port (208A; 208B) is shut off while permitting transfer of the melt from the input port (206A; 206B) to the shooting-pot assembly (202A; 202B). During the second operation mode, the input port (206A; 206B) is shut off while permitting the shooting-pot assembly (202A; 202B) to push the melt from the transfer port (210A; 210B) to the output port (208A; 208B). During the third operation mode, a hold pressure is permitted to be applied from the input port (206A; 206B) to the output port (208A; 208B), and the hold pressure is not provided by the shooting-pot assembly (202A; 202B).

More specifically, the molding system (100) may further includes (but is not limited to): a mold-tool assembly (140) having (but is not limited to): the valve assembly (204A; 204B), and the shooting-pot assembly (202A; 202B). There are two variations contemplated for the above arrangement. According to a first variation, the third operation mode of the valve assembly (204A; 204B) is adapted so that the hold pressure is applied from the input port (206A; 206B) to the output port (208A; 208B), while the transfer port (210A; 210B) is shut off, and as a result the shooting-pot assembly (202A; 202B) does not become filled during the third operation mode. According to a second variation, the third operation mode of the valve assembly (204A; 204B) is adapted so that the hold pressure is applied from the input port (206A; 206B) to the output port (208A; 208B), while the transfer port (210A; 210B) is open so as to permit the melt to fill the shooting-pot assembly (202A; 202B) during the third operation mode.

FIG. 3 depicts yet another schematic representation of the molding system (100) of FIG. 1, in which the molding system (100) further includes (but is not limited to): (i) the machine melt-feeder assembly (120) having the valve assembly (104) and the shooting-pot assembly (102), and (ii) the mold-tool assembly (140) having the valve assembly (204A; 204B) and the shooting-pot assembly (202A; 202B).

Additional Description

An aspect of the present invention provides a modification to the process whereby the hold portion of the machine cycle allows for the machine to apply the hold pressure, and consequently mass compensation, required by the part to be molded. Among the further aspects of the operation is the use of this hold time to also refill the shooting pot assembly. As the hold phase does not require a large amount of material there is minimal flow required for mass compensation and is related to the pvT (pressure volume, temperature) nature of the cooling molded material. Further to this the refill rate required with this sequence is smaller and allows a much slower transfer of melt into the shooting pot assemblies. Generally the longest single portion of the molding cycle is hold and this plus the cool time allows a longer refill than if it did not occur during hold. An embodiment may include the use of a ball check, instead of separately actuated pin or other, between the refill circuit and shooting pot circuit.

The operation would be to fill with the shooting pot and shortly after the start of fill the first stage hold pressure is applied. As the fill pressure is greater the ball check ensures the melt moves into the mold cavity until the shooting pot assembly has finished its fill profile causing the pressure in the fill circuit to drop and the ball check to move forward when it drops to, or just below the pressure in the refill circuit that has been pre-pressurized. In this way hold is pressure controlled and never goes below the operator set point pressure. The transition position can also remain pressure or position controlled as preferred by the operator.

Another benefit of this is due to the increased time for the refill. As the refill time is now much greater the material can move through the channels much slower. This should reduce the shear in the melt and potentially reduce degradation. There may be benefits to the balance of the melt at low injection speeds as well. To date fill rate has been shown to not influence balance in a geometrically balanced runner however, it has been shown to have en effect on a non-geometrically balanced runner.

A further potential embodiment may result in energy savings, the quantity of which is to be determined. The molding machine operation today commonly starts fill by compressing the melt between the injection unit and the cavity as the pressure required for the desired fill rate is reached. Then at the end of the hold phase the melt is depressurized for at least one reason, the valve gates should be opened substantially before fill to ensure good gate quality. The addition of the refill shut-off valve prior to the shooting pot assembly allows isolation of the gates from the bulk of the runner channels. By shutting off this valve at the end of the refill circuit, which contains the bulk of the hot runner channels, the melt pressure may remain at least as high as the set hold pressure at all times during the cycle. Today there is no energy recovered by decompressing the melt like charging a battery and then short circuiting it. The proposed embodiment charges the battery then leaves a base amount of energy until the machine is shut down. There are potential benefits from this as well including a potential embodiment where the machine shooting pot is eliminated and the machine is simplified to either a reciprocating screw or a non-reciprocating screw. In the case of the reciprocating screw the back pressure would remain constant at the hold pressure and the screw would move forward as required to refill and hold, the remaining time would have it moving backward. In the case of the non-reciprocating screw the pressure in the circuit would rise and fall above the hold pressure. The back pressure during refill would be constant and then would increase during injection which is a very short portion of the cycle. This may require some additional control on the metering of the melt at the refill shut-off but may see cost benefit regardless when compared to the cost of reciprocating the screw.

The injection function currently employed by the machine to be moved to the runner immediately before one, or several, mold cavities. The refill of those shooting pot assemblies is then accomplished by either the machine injection unit or the machine extruder. Isolation of these two zones is by the refill shut-off valve.

A shooting pot assembly local to the injection molding machine cavities with a refill shut-of before it allows isolation of the preceding and a refill circuit. As mentioned previously a ball check may be used and is completely compatible with the proposed process. The refill circuit is similar to the well known hot runner circuit and the machine injection unit can be either the reciprocating screw (RS) unit or the P-unit (shooting pot unit) as throughout requires. The RS unit in this case may be able to operate with continuous recovery.

An operation is simply the use of hold pressure through the refill circuit to not only hold but to refill the shooting pot assemblies with the separation being controlled by the refill shut-off valve, either actively or passively with a ball check. Provided the machine is capable of maintaining the hold pressure while the melt is transferred there may not be any limitations.

The operation is a process change and is allowed by the multi stage operation of a runner with local injection sites in addition to a low pressure refill circuit similar. The refill circuit is similar in appearance to that seen in the molding system using a hot runner for melt distribution. The difference is that the multi stage system employs shooting pots, or other pressure and flow generating device, locally to a small number of cavities. The small ratio of cavities to injection unit allows an improvement in balance over the entire mold face during fill, positional control, but can complicate the hold sequence by pressure control. The operation of the process is to employ the local injection sites during fill and refill them during hold where the machine injection can provide an even pressure distribution throughout the melt channels. This may be applied in many combinations of melt transfer stages including two and three stage operation. The operation may assume three stage operation including a machine extruder, a machine shooting pot, and multiple hot runner shooting pots. The operation may also use a mechanically actuated refill shut-off valve but a ball check valve that may operate just as well and would provide virtually instantaneous switching from fill to hold/refill.

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim. It is noted that the foregoing has outlined the non-limiting embodiments. Thus, although the description is made for particular non-limiting embodiments, the scope of the present invention is suitable and applicable to other arrangements and applications. Modifications to the non-limiting embodiments can be effected without departing from the scope of the independent claims. It is understood that the non-limiting embodiments are merely illustrative.

What is claimed is:

1. A molding system (100), comprising:
   a shooting-pot assembly (102; 202A; 202B); and
   a valve assembly (104; 204A; 204B) having an input port (106; 206A; 206B) being configured to input a melt, an output port (108; 208A; 208B) being configured to output the melt, and a transfer port (110; 210A; 210B) connected to the shooting-pot assembly (102; 202A; 202B), the valve assembly is configured to operate in:
   (i) a first operation mode in which the output port is shut off while permitting transfer of the melt from the input port to the shooting-pot assembly;
   (ii) a second operation mode in which the input port is shut off while permitting the shooting-pot assembly to push the melt from the transfer port to the output port; and
   (iii) a third operation mode in which a hold pressure is permitted to be applied from the input port to the output port, and in which the transfer port is open to allow the transfer of melt to the shooting-pot assembly.

2. The molding system (100) of claim 1, further comprising:
   a machine melt-feeder assembly (120) having the valve assembly (104) and the shooting-pot assembly (102).

3. The molding system (100) of claim 2, further comprising:
   a fourth operation mode of the valve assembly (104) in which the valve assembly is adapted so that the hold pressure is applied from the input port (106) to the output port (108) while the transfer port (110) is shut off, and as a result the shooting-pot assembly (102) does not become filled during the fourth operation mode.

4. The molding system (100) of claim 1, further comprising:
   a mold-tool assembly (140) having the valve assembly (204A; 204B) and the shooting-pot assembly (202A; 202B).

5. The molding system (100) of claim 4, further comprising:
   a fourth operation mode of the valve assembly (204A; 204B) in which the valve assembly is adapted so that the hold pressure is applied from the input port (206A; 206B) to the output port (208A; 208B) while the transfer port (210A; 210B) is shut off, and as a result the shooting-pot assembly (202A; 202B) does not become filled during the fourth operation mode.

6. The molding system (100) of claim 1, further comprising:
   a machine melt-feeder assembly (120) having the valve assembly (104) and the shooting-pot assembly (102); and
   a mold-tool assembly (140) having the valve assembly (204A; 204B) and the shooting-pot assembly (202A; 202B).

7. A molding system, comprising:
   a shooting-pot assembly; and
   a valve assembly having:
   an input port fluidly connecting a machine injecting unit with the valve assembly, the valve assembly operable to open the input port to receive melt into the valve assembly from the machine injecting unit, and the valve assembly operable to close the input port to inhibit the melt from entering the valve assembly from the machine injecting unit;
   an output port fluidly connecting a mold cavity with the valve assembly, the valve assembly operable to open the output port to permit the expelling of melt from the valve assembly into the mold cavity, and the valve assembly operable to close the output port to inhibit the melt from exiting the valve assembly into the mold cavity; and
   a transfer port fluidly connecting the shooting pot assembly to the valve assembly, the valve assembly operable to open the transfer port to permit melt to flow between the shooting pot assembly and the valve assembly, and the valve assembly operable to close the transfer port to inhibit melt from flowing between the shooting pot assembly and the valve assembly.

8. The molding system of claim 7, wherein:
   the valve assembly is configured to operate in:
   (i) a first operation mode in which the output port is closed, the input port is open and the transfer port is open for permitting movement of the melt to the shooting-pot assembly;
   (ii) a second operation mode in which the input port is closed, the transfer port is open and the output port is open for permitting movement of the melt from the shooting-pot assembly to the mold cavity; and
   (iii) a third operation mode in which the input port is open, the output port is open and the transfer port is open for permitting the melt to move into the shooting pot assembly by operation of a hold pressure applied from the input port to the output port.

9. The molding system of claim 8, further comprising:
   a machine melt-feeder assembly having the valve assembly and the shooting-pot assembly.

10. The molding system of claim 8, further comprising:
    a mold-tool assembly having the valve assembly and the shooting-pot assembly.

11. The molding system of claim 8, further comprising:
    a machine melt-feeder assembly having the valve assembly and the shooting-pot assembly; and
    a mold-tool assembly having the valve assembly and the shooting-pot assembly.

12. The molding system of claim 7, wherein the transfer valve comprises a ball check valve.

13. The molding system of claim 7, wherein the valve assembly comprises a mechanically actuated valve.

14. The molding system of claim 7, further comprising the machine injecting unit fluidly connected to the valve assembly through the input port.

15. A method of molding, comprising:
    opening an output valve connecting a valve assembly to a mold cavity for allowing melt to pass from the valve assembly to the mold cavity;
    opening a transfer valve to fluidly connect the shooting pot assembly to the valve assembly;
    injecting melt from the shooting pot assembly through the valve assembly into the mold cavity;
    opening an input valve to fluidly connect a machine injecting unit to the valve assembly;
    applying a hold pressure to the mold cavity to refill the shooting pot assembly with melt passing from the machine injecting unit through the valve assembly; and
    closing the output valve to prohibit melt flowing to the mold cavity.

* * * * *